United States Patent [19]

Prigent et al.

[11] 4,363,707
[45] Dec. 14, 1982

[54] ACTIVATED NICKEL-CONTAINING ELECTRODE AND ITS USE PARTICULARLY FOR WATER ELECTROLYSIS

[75] Inventors: Michel Prigent, Rueil Malmaison; Lucien Martin, Issy les Moulineaux, both of France

[73] Assignee: Institut Francais du Petrole, Rueil-Malmaison, France

[21] Appl. No.: 160,785

[22] Filed: Jun. 18, 1980

[30] Foreign Application Priority Data

Jun. 18, 1979 [FR] France .................. 79 15750

[51] Int. Cl.³ .................. C25B 1/04; C25B 11/06; B05D 1/00
[52] U.S. Cl. .................. 204/129; 204/290 R; 204/291; 204/292; 429/40; 429/223; 427/126.6
[58] Field of Search .............. 204/290 R, 291, 292, 204/129; 429/40, 223; 427/126.6

[56] References Cited

U.S. PATENT DOCUMENTS

| | | | |
|---|---|---|---|
| 3,637,437 | 1/1972 | Goldberger | 429/44 |
| 3,926,675 | 12/1975 | Kohlmuller et al. | 429/40 X |
| 3,997,478 | 12/1976 | Petro | 252/470 |
| 4,132,620 | 1/1979 | Nidola et al. | 204/242 |
| 4,190,516 | 2/1980 | Kajimaya et al. | 204/290 R |
| 4,200,515 | 4/1980 | Hall et al. | 204/290 R |
| 4,224,133 | 9/1980 | Takahashi | 204/290 R |
| 4,255,247 | 3/1981 | Oda et al. | 204/293 |

FOREIGN PATENT DOCUMENTS 411528 3/1925 Fed. Rep. of Germany .
414969 6/1925 Fed. Rep. of Germany .
729357 7/1932 France .

OTHER PUBLICATIONS

Perdereau, Compt. Rendus vol. 267, Series C, pp. 1288-1291, 11/68.
Catalysts from Alloys of Nickel and Non-Catalytic Metals by Kirkpatrick, pub. by Int'l Nickel, New York, 1948.
Justi et al, J. Electochem. Soc., vol. 108, pp. 1073-1079, 11/1961.
Aleskovskii et al, J. Vyssh. Zaved., Kham. Tekhnol vol. 14, pp. 369-372 (1971) Chem. Abs. vol. 77, Abs. 1470r (1971).
Kanaya et al, Japanese K.T.K. 79 38, 277 (3/79), Chem. Abs. vol. 91, Abs. 29670h (1979).
Hine et al, Denki Kagaku Oyobi Kogyo Batsuki Kagaku vol. 47, pp. 401-408 (1979) Chem. Abs. vol. 91, Abs. 183, 896t (1979).

Primary Examiner—F. Edmundson
Attorney, Agent, or Firm—Millen & White

[57] ABSTRACT

A low polarization electrode which is stable and safe to use, is manufactured by forming a layer of divided nickel or nickel alloy on an electricity-conducting substrate and thereafter sulfiding the surface of the resultant material. For example, a Raney nickel alloy is deposited on the substrate, the alloy metal is removed and the resultant material is sulfided.

9 Claims, No Drawings

ACTIVATED NICKEL-CONTAINING ELECTRODE AND ITS USE PARTICULARLY FOR WATER ELECTROLYSIS

BACKGROUND OF THE INVENTION

The present invention relates to electrodes which can be used, for example, for water electrolysis in the presence of an aqueous alkaline electrolyte, or more generally in any electrolysis process operated in aqueous alkaline medium with catalyst-activated electrodes. These electrodes are more particularly adapted to be used as negative electrodes (cathodes) for hydrogen release; they can also be used as positive electrodes (anodes) for oxygen release.

THE PRIOR ART

The use of electrodes coated with massive nickel-sulfur alloys obtained by electroplating is already disclosed (German Pat. Nos. 411528 and 414969). These electrodes provide for a reduction of the over-voltage when releasing oxygen and hydrogen by water electrolysis in the presence of an aqueous alkaline electrolyte. They have however the disadvantage of a short life time and of a slow disintegration in the course of time. This disintegration results from the passage of sulfur into solution, particularly according to one of the following reactions:

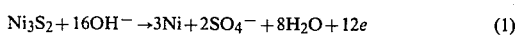
$$Ni_3S_2 + 16OH^- \rightarrow 3Ni + 2SO_4^- + 8H_2O + 12e \qquad (1)$$

$$Ni_3S_2 + 4e \rightarrow 3Ni + 2S^- \qquad (2)$$

It can be determined from the thermodynamic functions of massive $Ni_3S_2$ that reaction (1) can take place as above from the left to the right at electrochemical potentials higher than +0.248 volt (with respect to the equilibrium potential of the hydrogen electrode at pH=14), which occurs when releasing oxygen at potentials above 1.23 volt.

It can also be determined that reaction (2) will take place from the left to the right with massive $Ni_3S_2$ at potentials lower than −0.15 volt, which also occurs for the hydrogen release, taking the over-voltage into account.

When using the electrode, the catalytic layer of nickel-sulfur alloy is progressively converted to a layer of divided nickel (or nickel oxide) which has poor adherence onto the carrier.

The use of electrodes comprising very finely divided nickel (Raney nickel), obtained by attack of nickel-aluminum alloys, has also been proposed (see, for example, the French Pat. No. 729 357). Electrodes of this type may be obtained by sintering mixtures of nickel and nickel-aluminum alloy powders (see Justi, E. W. and Winsel, A. W.; J. Electrochem. Soc. 108, 11, 1073–1079, 1961) or by projecting particles of molten nickel-aluminum alloy onto a metal carrier with a plasma blow-pipe and thereafter dissolving the aluminum of the carrier by alkaline attack (see U.S. Pat. No. 3,637,437). These electrodes can also be used to decrease the overvoltages when oxygen and hydrogen evolve in the case of water electrolysis with an alkaline electrolyte. The Raney nickel based catalyst has however the disadvantage to strongly accumulate hydrogen, when prepared or used as cathode, and to become pyrophoric (a highly exothermic oxidation occurs when the catalyst is exposed to the air). This catalyst has also the disadvantage to catalyze the $H_2+O_2$ reaction and to be responsible for explosive reactions when hydrogen unexpectedly mixes with oxygen in the electrolysis apparatus.

THE INVENTION

The low over-voltage electrode of the invention does not have the disadvantages of the known massive nickel sulfide electrodes or of the electrodes with very finely divided nickel of the Raney nickel type. They can be safely used and are very stable in the course of time.

The electrodes according to the invention have a catalyst layer destined to decrease the over-voltages and thus to decrease the specific consumption of electric power. It has been found that an electrode with low over-voltage can be obtained by depositing, on an electricity conducting substrate, a finely divided nickel coating whose surface is treated to deposit thereon a small superficial amount of sulfur. Other coatings may be obtained, according to the invention, by replacing the coating of finely divided pure nickel applied to the electrodes with a coating of nickel containing 0 to 80% of Fe, Co, Cr or Mn and/or 0 to 15% of Mg, Al, Si, Ti, V, Cu, Zn, Zr, Nb, Mo, Sn, La, Ta, W, Pb or Bi, with respect to nickel of the coating.

Without being bound by an explanation of the phenomenon observed, it is thought that sulfur is present at the nickel surface in the adsorbed state or in a combined state as absorbed bi-dimensianal nickel sulfide (cf. M. PERDEREAU, Comptes Rendus 267, 1288, 1968). The weight of the sulfur thus deposited is normally low, in most cases lower than 1% of the nickel weight, for example 0.01 to 1% of this weight. Since this sulfur is only present at the surface, it is more strongly linked to nickel than the sulfur of the massive sulfides and cannot destroy the mechanical strength of the catalyst layer by passing into solution.

As a rule, the electrodes according to the invention are manufactured in two steps:

(a) a layer of divided nickel (or divided mixture or alloy of nickel with one or more of the other metals mentioned above) is first formed on an electricity-conducting substrate, and then (b) the product from the step (a) is subjected to sulfurization under conditions permitting the superficial adsorption of sulfur.

A preferred method for preparing electrodes according to the invention consists of applying a layer of nickel-aluminum alloy with a plasma blow-pipe onto a massive metal support, for example, a continuous plate, a sintered metal sheet, a cloth or a grid, said alloy preferably containing from 45 to 55% b.w. of each of the metals. This alloy layer may be applied by using a preformed nickel-aluminum alloy. The two metals may also be blown separately; annealing at temperatures of from 200° to 800° C., for example, for 1 to 8 hours, may thereafter be performed to facilitate the formation of the nickel-aluminum alloy. Any other process for forming a layer of nickel-aluminum alloy on the electrode may be used. For example, an aluminum film may be formed at a nickel surface by evaporating aluminum in vacuum and thereafter annealing to diffuse aluminum throughout the nickel. Nickel and aluminum sheets may also be co-laminated and thereafter heat-treated. The thickness of the nickel-aluminum layer may usefully range from 5 to 150μ or more, preferably 20 to 80μ.

This layer of nickel-aluminum alloy is thereafter subjected to a chemical treatment of known type with an aqueous sodium hydroxide or potassium hydroxide solution, so as to dissolve aluminum. A preferred embodiment is as follows: the treatment is first operated in the cold with a dilute caustic solution (for example 1 to 2 N) up to the end of the hydrogen release. The concentration of the sodium hydroxide or potassium hydroxide solution is then increased (6 to 10 N) and the temperature is raised up to 60°–80° C.

Layers of divided nickel which can be used for manufacturing electrodes conforming to the invention may be obtained, substantially in the same manner, from such alloys as those of nickel-magnesium, nickel-zinc, nickel-silicon and nickel-mercury which are used in appropriate proportions and activated by such techniques as disclosed by W. J. Kirkpatrick (Catalysts from alloys of nickel and non-catalytic metals - an ICL-12 publication by the International Nickel Company Inc. NEW YORK, 1948) and which comprise selective evaporation, acidic or alkaline hydrolysis, selective chlorination and oxidation.

The electrodes may also be manufactured with other forms of divided nickel obtained either by decomposing nickel carbonyl or decomposing and reducing nickel salts, for example nickel nitrate, formate or oxalate, or by galvanoplasty or by any other method: it is essential to apply first a nickel layer and then sulfur, and not simultaneously nickel and sulfur as in the known technique.

In the process of the invention, the divided nickel layer obtained by one of the above processes is thereafter contacted with sulfur or a sulfur compound able to release sulfur in contact with the nickel surface. This sulfiding step may be effected with sulfur at the zero oxidation degree by placing the electrode in an enclosure containing sulfur vapor. This operation is advantageously performed at a temperature of 150° to 400° C., preferably 200° to 300° C. Elemental sulfur may also be used as a solution in an organic solvent, for example, ethyl alcohol, benzene, toluene, ethyl ether, carbon tetrachloride, carbon disulfide, phenol or aniline. The treatment is preferably achieved by immersing the electrode in the solvent boiling at reflux.

Sulfur may also be used in the −2 oxidation degree, for example, by using gaseous or dissolved $H_2S$ or a solution of an organic or inorganic sulfide or polysulfide.

The treatment with gaseous $H_2S$ may be performed at a moderate temperature, for example, at 0°–200° C., preferably 0°–50° C., preferably with a dilute gas containing, for example, 0.01 to 10% by volume of $H_2S$ in an inert gas (nitrogen, helium, argon) or a reducing gas (hydrogen). A too severe treatment must be avoided, which would result in excessive sulfiding. A heat treatment under partial vacuum or in an inert or reducing gas may be advantageous to stabilize the sulfide layer; this operation may be conducted under a positive $H_2S$ partial pressure.

Hydrogen sulfide may also be used as a solution in a solvent, for example, water, carbon disulfide or alcohol. Ammonium sulfide or an alkali metal sulfide may also be used. A heat treatment under reduced pressure or in an inert or reducing gas may be performed to stabilize the sulfide layer, just as when sulfiding with $H_2S$ gas.

Another method for sulfiding the nickel surface may comprise a treatment with an aqueous solution of a thiouslfate after dissolution of aluminum from the Raney alloy.

Another method comprises treating the divided nickel with a solution of an organic sulfur compound, for example, mercaptan, disulfide, thiourea, thioacetamide or the like.

Other methods for fixing sulfur by adsorption are known in the art of catalysis.

The treatment usefully terminates with heating under vacuum or in an inert gas atmosphere, for example in nitrogen or argon, at 200°–600° C. or preferably at 250°–450° C. The stability of the electrode is thus increased.

EXAMPLE 1 (comparison)

A nickel grid of 4×4 cm is cut into a 4.5×100×30 sheet of expanded metal (first figure: distance between two perforations in mm; second figure: width of the strips in (1/100) mm; third figure: thickness of the metal sheet in (1/100) mm).

The grid is first sand-blasted, degreased and then electrolytically scaled. It is then used as cathode in a bath having the following characteristics:

| | |
|---|---|
| $NiSO_4, 7H_2O$ | 200 g/l |
| $NiCl_2, 6H_2O$ | 45 g/l |
| $NH_4Cl$ | 50 g/l |
| $Na_2S_2O_3$ | 50 g/l |
| $H_3BO_3$ | 30 g/l |
| $NaCH_3CO_2$ | 15 g/l |
| pH | 4.5 |
| temperature | 35–40° C. |

The electrolysis is performed with a current density of 1.5 $A.dm^{-2}$. A 30 $mg.cm^{-2}$ layer of nickel-sulfur alloy is obtained in 2 hours. The analysis of this layer shows that it contains 18% b.w. of sulfur.

This electrode is then used as cathode for electrolysing water at 160° C. in 33% KOH under 22 bars. The anode is a similar grid of expanded nickel without catalytic activation. These two electrodes are pressed on each side of an asbestos diaphragm (asbestos: Ferlam 844).

The evolution versus time of the cell voltage obtained with this electrode is shown in Table I. This electrode has a relatively high over-voltage, which increases quickly in the course of time. After 1500 hours of use, the electrode is disassembled for inspection. The catalyst layer has disappeared at places; at other places, it is friable and easily eliminated.

EXAMPLE 2 (comparison)

A nickel grid similar to that used in Example 1 is sand-blasted and then coated with a layer of nickel-aluminum alloy by projection with a plasma blow-pipe. The amount of alloy thus deposited is 47 $mg/cm^2$. After a 4-hour annealing in an inert gas (nitrogen) at 400° C., the electrode is immersed in a bath of 2 N caustic potassium hydroxide. When the hydrogen release is practically terminated, the potassium hydroxide solution is replaced with a 8 N potassium hydroxide solution and the temperature of the bath is progressively raised to 70° C.

After washing with distilled water, the electrode is used for electrolysing water in the same conditions as in Example No. 1.

The evolution versus time of the cell voltage obtained with this electrode is shown in Table I.

After 250 hours of use, an air return into the cathode compartment resulted in an explosion at the cathode surface, which damaged the latter.

A second experiment, effected with a similar electrode, also resulted in an explosion after 375 hours of use, following a slight loss of gas between the compartments at the diaphragm level.

EXAMPLE 3 (according to the invention)

A nickel grid is activated as in Example 2. After attack of aluminum with potassium hydroxide, the electrode is washed and immersed for 10 minutes in an aqueous solution of an acetic acid-acetate buffer at pH=4.5, saturated with $H_2S$ at room temperature.

The electrode is then washed with distilled water, dried in a drying-oven at 80° C. and then heated for 2 hours in nitrogen at 280° C.

After the latter treatment, the electrode is used for electrolysing water in the same conditions as in Examples 1 and 2. The evolution of the cell voltage versus time is shown in Table I. It is found that the over-voltage is low and does not change much in the course of time.

No explosive reaction between oxygen and hydrogen is observed over this long test period, although the asbestos diaphragm was damaged at places, which necessitated replacing it. At the end of the experiment, an inspection of the electrode showed that the catalytic layer was still present and that its adherence was good.

EXAMPLE 4 (according to the invention)

A nickel grid similar to that used in Example 1 was cut by sand-blasting and coated with an alloy layer by projecting with a plasma blower a mechanical mixture of two powders respectively containing (47% Al, 45% Ni, 8% Ti) and (50% Al, 50% Co). The alloy had the following composition: 49% Al, 17% Ni, 31% Co and 3% Ti. The amount of alloy thus deposited was 45 mg/cm². After a 4 hour-annealing under inert gas (nitrogen) at 400° C., the electrode was activated in the same manner as in Example 3 and tested for water electrolysis in the same conditions. The evolution of the cell voltage versus time is shown in Table I. It is observed that the overvoltage is low and does not vary much in the course of time. No explosive reaction between oxygen and hydrogen was noted. At the end of the test, the electrode was inspected and found to have suffered no damage.

TABLE I

Electrolysis of water in 33% KOH - 160° C. - 22 bars - 1 A·cm$^{-2}$ - Cell voltage versus time (volts).

| TIME (hours) | WITHOUT ACTIVATION | EXAMPLE 1 | EXAMPLE 2 | EXAMPLE 3 | EXAMPLE 4 |
| --- | --- | --- | --- | --- | --- |
| 0 | 1.97 | 1.80 | 1.74/1.75 | 1.72 | 1.68 |
| 200 | 2.14 | 1.85 | 1.80/1.79 | 1.75 | 1.70 |
| 500 | 2.19 | 1.95 | End of the tests at 250 h and 375 h following explosions. | 1.78 | 1.72 |
| 1000 | 2.18 | 2.15 | | 1.78 | 1.72 |
| 1500 | 2.19 | 2.18 End of test | | 1.79 | 1.74 |
| 2000 | 2.20 | | | 1.78 | 1.74 |
| 2500 | 2.20 | | | 1.80 | 1.75 |
| 3000 | 2.20 | | | 1.80 | 1.75 |

What is claimed is:

1. A safe, stable low polarization electrode, produced by the process comprising the steps of:
   (a) sulfiding a layer of divided metallic nickel or nickel-containing metal alloy consisting essentially of nickel and 0–80% by weight of Fe, Co, Cr or Mn and/or 0–15% by weight of Mg, Al, Si, Ti, V, Cu, Zn, Zr, Nb, Mo, Sn, La, Ta, W, Pb or Bi, with respect to the nickel, said layer being previously deposited on an electrically conductive substrate, under conditions producing substantially only superficial sulfur deposition; and thereafter
   (b) heating the resultant superficially sulfided electrode at 200°–600° C. in an inert gas atmosphere or in a vacuum.

2. An electrode according to claim 1, wherein step (a) is effected by contacting said layer with an aqueous solution of hydrogen sulfide.

3. An electrode according to claim 2, wherein said aqueous solution of hydrogen sulfide is a solution in aqueous ammonia, the sulfide species in said solution being ammonium sulfide.

4. An electrode according to claim 1, wherein said nickel-containing metal alloy is an alloy of nickel, cobalt and titanium.

5. An electrode according to claim 1, wherein step (a) is effected by contacting said layer with elemental sulfur.

6. An electrode according to claim 1, wherein step (a) is effected by contacting said layer with gaseous hydrogen sulfide.

7. An electrode according to claim 1, wherein in step (b), the heating is effected at 250°–450° C.

8. The process of claim 1, wherein said electrode is used as a cathode.

9. In the electrolysis of water using at least one electrode, the improvement comprising using as said electrode the electrode of claim 1.

* * * * *